R. L. FRINK.
DEVICE FOR SEVERING GLASS CYLINDERS.
APPLICATION FILED JUNE 20, 1907.
1,024,983.
Patented Apr. 30, 1912.
3 SHEETS—SHEET 1.
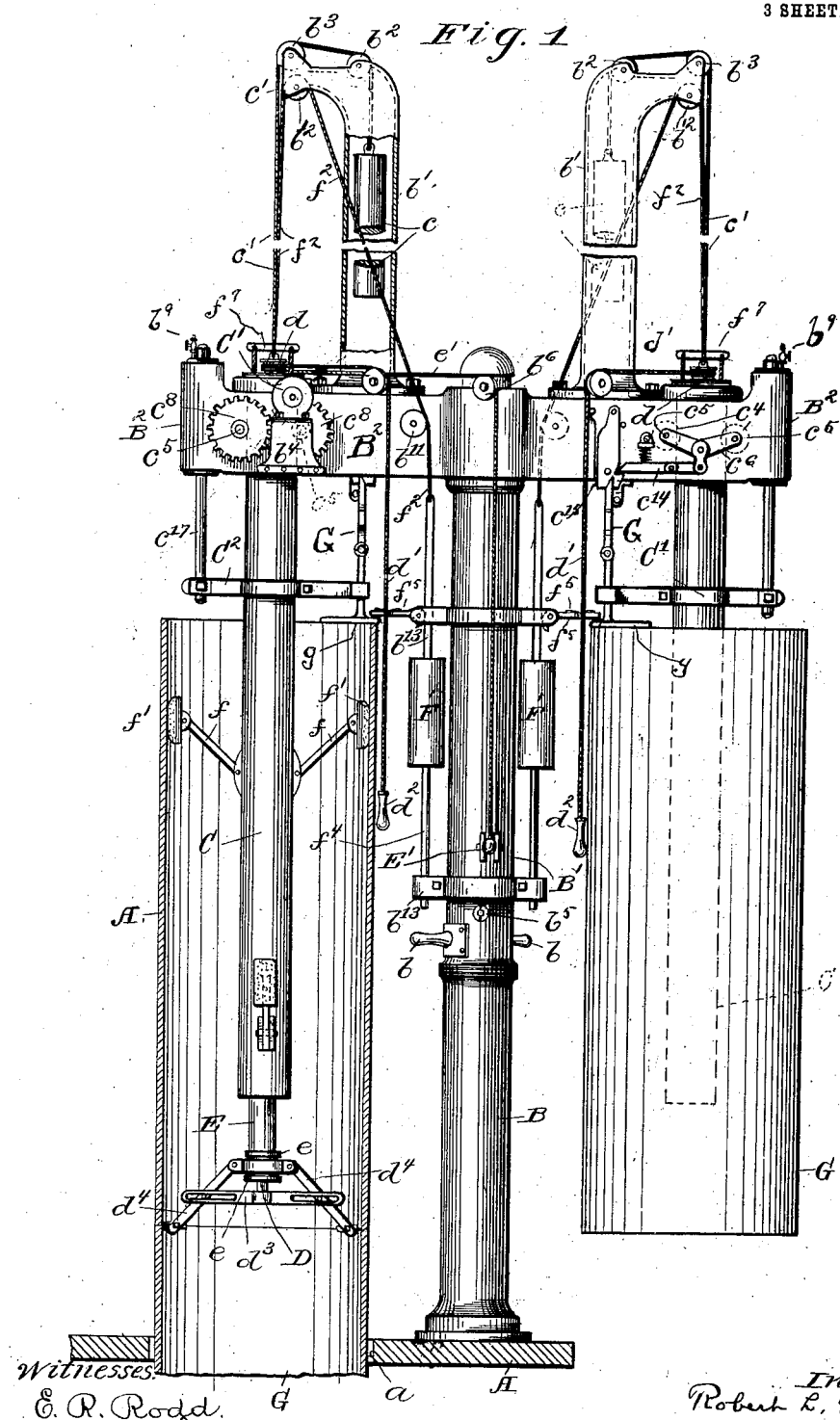

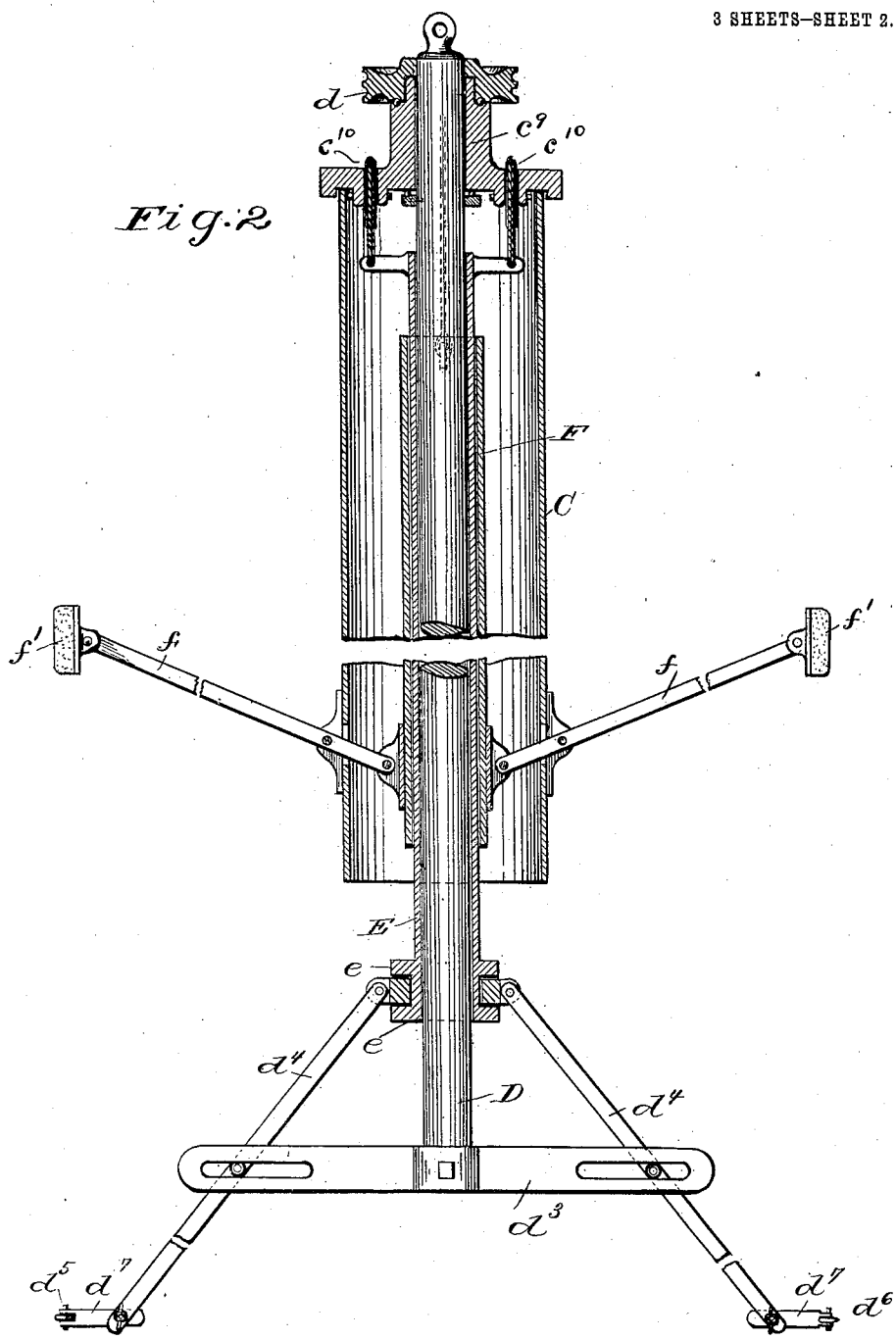

R. L. FRINK.
DEVICE FOR SEVERING GLASS CYLINDERS.
APPLICATION FILED JUNE 20, 1907.
1,024,983.
Patented Apr. 30, 1912.
3 SHEETS—SHEET 3.
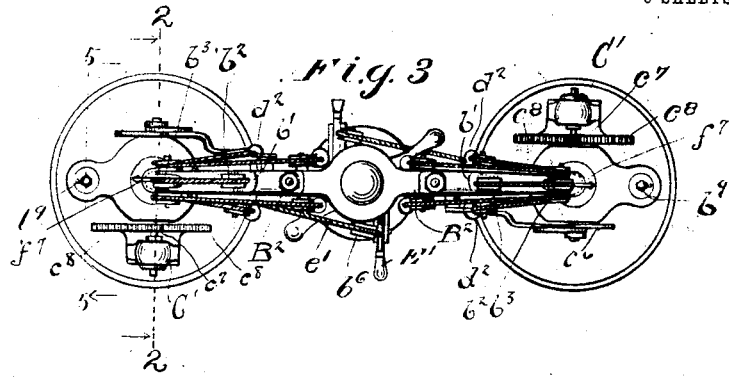
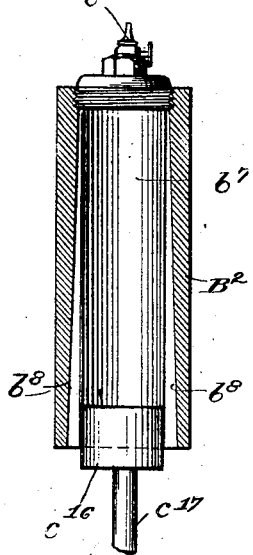
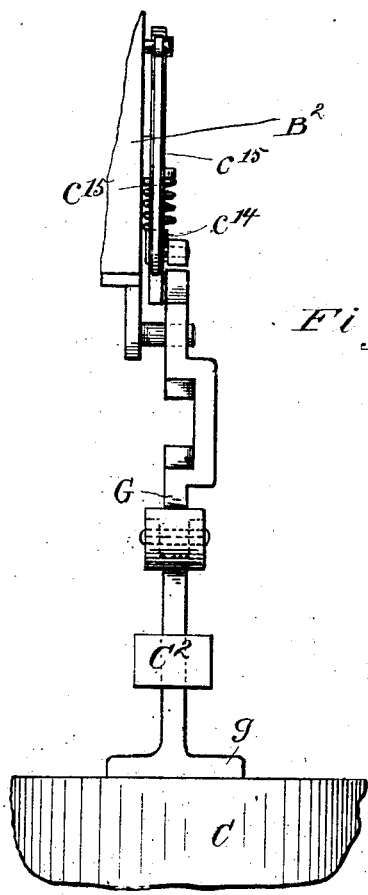
Witnesses:
E. R. Rodd.
Jno. F. Oberlin
Inventor:
Robert L. Frink,
by J. B. Fay
his attorney

UNITED STATES PATENT OFFICE.

ROBERT L. FRINK, OF CLEVELAND, OHIO.

DEVICE FOR SEVERING GLASS CYLINDERS.

1,024,983.  Specification of Letters Patent.  Patented Apr. 30, 1912.

Application filed June 20, 1907. Serial No. 379,846.

*To all whom it may concern:*

Be it known that I, ROBERT L. FRINK, citizen of the United States, resident of Cleveland, county of Cuyahoga, and State of Ohio, have invented a new and useful Improvement in Devices for Severing Glass Cylinders, of which the following is a specification, the principle of the invention being herein explained and the best mode in which I have contemplated applying that principle, so as to distinguish it from other inventions.

My present invention, relating, as stated, to devices for severing glass cylinders, has particular regard to the provision of a device of this character for use in connection with glass drawing apparatus or mechanism of the kind described and claimed in United States Letters Patent No. 846,102, issued to me March 5, 1907. The feature of such mechanism or apparatus, and of the method therein involved, is the drawing of a continuous cylinder of glass of indefinite length from a molten bath, such cylinder not being capped as is the case in prevailing methods of glass drawing. Obviously the conditions presented where the cylinder is thus drawn, instead of being drawn in a single capped section of limited length, make possible the utilization of much more effective and in effect substantially automatic means for severing from the continuous cylinder successive sections of the required length. It is not intended, however, by thus referring my present invention to the specific glass drawing apparatus noted above, to imply that the cylinder severing device here disclosed is limited in its application to this one form of drawing apparatus, nor in its use to the severing from a continuously moving cylinder of indefinite length, sections of such length as may be desired. As will appear such device is equally adaptable to the cutting up of cylinders entirely independently of the manner in which they are drawn.

Said invention then consists of the means hereinafter fully described and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 represents a side elevation, with parts broken away and yet other parts in section, showing one approved form of device embodying my invention; Fig. 2 is a vertical cross-section of a detail of such device; Fig. 3 is a plan view of the device as shown in Fig. 1; Fig. 4 is a side elevation of another detail of such device; and Fig. 5 is a cross-section of a third detail.

This glass severing device is designed to be mounted or otherwise suitably supported directly over the drawing apparatus, which is designed to supply to the device the continuously moving cylinder of indefinite length from the bath of molten glass in connection with which such drawing apparatus is operated. No part of the latter is illustrated in the present application but merely the upper portion of the continuous cylinder just referred to; this cylinder is designated by the letter A and is conveniently allowed to pass upwardly through an opening $a$ in the floor or platform A' located above the apparatus in question. Upon the platform thus provided adjacent to the opening $a$ is mounted the post or column B that constitutes the central support of the severing device now to be described. Upon the upper portion of this column is rotatably mounted a sleeve B' that bears two oppositely extending arms $B^2$ of sufficient length, respectively, to extend over the opening $a$ when properly directed with reference to the axis about which they are thus seen to be rotatable. Swinging of these arms to thus direct them is obviously effected by rotation of sleeve B', and to facilitate such movement of the latter, handles $b$ are provided near the lower end thereof. In view of the fact that all the weight of the apparatus is borne by this sleeve it is desirable that the latter be formed with ball-bearing or similar anti-friction means at its several points of support or bearing surfaces. The construction of such bearing being well understood, no illustration thereof is deemed necessary.

Upon each of the arms $B^2$ is mounted a duplicate cylinder severing mechanism, such as forms the subject matter proper of this application. Each such severing mechanism is so located on the corresponding arm of the support as to lie in proper operative relation to the upwardly moving glass cylinder A when said arm is swung or positioned over opening $a$. As the mechanisms supported by the respective arms are duplicates of each other only one need obviously be described in detail. Each such mechanism comprises primarily an outer tubular shell or casing C, of such length as to extend downwardly from its corresponding supporting arm for a distance approximately that of the section which it is designed to sever from the continuous cylinder. Tubular casing C is mounted so as to be vertically movable in arm $B^2$, the latter being provided with a suitable bearing with this end in view. Upward actuation of the casing is adapted to be effected by means of a weight $c$ contained in a hollow standard $b'$ surmounting arm $B^2$ and provided with guide pulleys $b^2$ $b^3$ over which runs the cord $c'$ whereby said weight and casing are connected. This cord $c'$ is attached to an eye in the upper end of a shaft D to which the casing is attached by a head or cap that closes its upper end, Fig. 2. The further function subserved by shaft D will appear later. The casing C is designed to be actuated downwardly and to be normally maintained in its lowermost position, by means of two rolls $c^4$ in arm $B^2$ having friction engagement therewith, Fig. 1. These rolls are borne upon suitable shafts $c^5$, the outer ends of which on one side are journaled in toggle arms $c^6$, by proper actuation of which latter the rolls can be thrown into and out of engagement with the casing as desired. Rotation of the rolls, and consequent downward actuation of the casing when such rolls are in engagement therewith, is had by means of a small motor C' mounted on a bracket $b^4$ on one side by arm $B^2$ and provided with a pinion $c^7$ meshing with gears $c^8$ on the corresponding outer ends of roller-bearing shafts $c^5$, Fig. 3. The electric circuit wherein motor C' is included is controlled by means of a switch $b^5$ conveniently mounted in rotatable sleeve B adjacent to handles $b$.

Undue acceleration of movement on the part of casing C, when left free to move upwardly, is prevented by a dash-pot arrangement shown in detail in Fig. 5. Such arrangement includes the provision of a vertical cylindrical chamber $b^7$ in the outer end of arm $B^2$, in which cylinder is reciprocable a piston $c^{16}$ borne by a rod $c^{17}$ that is adjustably mounted in a bracket $C^2$ attached to the casing C. One or more grooves $b^8$, two are shown, in the walls of cylinder $b^7$, such grooves being of gradually decreasing depth to allow the piston and casing C to which it is attached to move rapidly at first but slow up and cushion the movement at the end. A vent valve $b^9$ in the closed end of the cylinder admits of still further regulation of such movement.

Centrally supported within suitable bearings in the upper end $c^9$ of casing C is the shaft D, already referred to, the lower end of which projects beyond the lower end of the casing. Upon the upper end of shaft D is mounted a pulley $d$ about which passes several times an actuating cord $d'$. The respective ends of the latter extend on either side of arm $B^2$ into position to be conveniently grasped by the operator in charge of the device, being provided with handles $d^2$, Figs. 1 and 3. Obviously, pulling upon one of these handles $d^2$ will rotate the shaft in one direction, while pulling upon the other will rotate the same in the opposite direction. Upon the lower end of shaft D is fixedly mounted a cross arm $d^3$, having elongated slots in its respective outer portions in which are slidably and also pivotally secured lever arms $d^4$. The inner ends of such lever arms $d^4$ are secured to a ring rotatably mounted upon the lower end of a tubular shaft E between collars $e$. The weight of tubular shaft E is designed to be sufficient, when the latter is left to itself, to actuate lever arms $d^4$ outwardly, and thereby press their lower ends against the inside of the glass cylinder where the device as a whole is in operative position with respect to the latter. The outer ends of such lever arms $d^4$ are respectively provided with a roller $d^5$ and a glass cutter $d^6$, the latter being preferably of the rotary character shown. In order that roller $d^5$ and cutter $d^6$ may thus bear against the inner surface of the cylinder at the proper angle, in case the device be employed with cylinders having different diameters, the two elements in question are not mounted directly upon the lever arms in question but upon short swiveled extensions $d^7$ thereof, Fig. 2. By means of these, adjustment in the particular noted may be readily effected.

Normally, for obvious reasons, lever arms $d^4$ require to be maintained in retracted position, the cutting operation taking place only at intervals. To hold tubular actuating shaft E in its upper position, corresponding to this inactive condition of the glass cutting device, a cord $e'$ having a bifurcated inner end is attached at such end to the upper end of the tube E and at its outer end to a hand lever E' mounted on sleeve B' and adapted to be locked or clamped, in a manner readily understood and hence not shown in detail, to thus retain said tube. Cord $e'$ is suitably guided over pulleys $b^6$ and $c^{10}$ on arm $B^2$ and the upper end $c^9$ of casing C, respectively.

Without tubular shaft E, wherewith the inner ends of lever arms $d^4$ as has been shown, are connected, is mounted a second tubular shaft F likewise reciprocable with respect to the central supporting shaft D. To this shaft F are pivotally secured the inner ends of two pairs of lever arms $f$ that are further pivotally attached intermediate of their ends to casing C. Their outer ends projecting without the casing a sufficient distance to enable them to contact with the inner face of the cylinder when desired. Upon such outer ends are borne gripper members $f'$, disposed as shown, Figs. 1 and 2. Reciprocation of shaft F by means of which reciprocation the lever arms $f$ are obviously thrust outwardly thus to grip the cylinder, is designed to be effected by means of a weight $F'$ with which such tube is connected through a cord $f^2$, Fig. 1. Cord $f^2$ is suitably guided over pulleys $b^{11}$ $b^{12}$ on arm $B^2$ and standard $b'$, and its inner end is bifurcated and an equalizer bar $f^7$ interposed as in the case of cord $e'$. Weight $F'$ is mounted upon a rod $f^4$ slidably held in vertically alined brackets $b^{13}$ projecting from sleeve $B'$, and is designed to be retained inactive by a lever $f^5$ mounted on the upper of said brackets and having a cam face disposed to engage rod $f^4$ and clamp the same against movement as will be readily understood.

Certain accessory features, or details, including means for automatically releasing lever $f^5$ and for similarly controlling toggle-arm $c^6$ and thus the engagement of friction rollers $c^4$ with casing C, can, it is thought, be most readily described in connection with the operation of the parts whose structure has now been set forth. Assuming then the upper end of a glass cylinder G to just project through opening $a$ in platform A, and further assuming casing C with the mechanism borne thereby to be in its raised position but centrally disposed over such opening, motor $C'$ will be set in operation and the feed-rolls $c^6$, being thus actuated, will lower the casing to meet the oncoming cylinder. When the limit of such downward movement of the casing is reached the latter will be maintained in such position, despite weight $c$, because of the continued engagement of rolls $c^6$ therewith. The cylinder gradually ascending laterally incloses the mechanism referred to as shown in Fig. 1. Disposed in the path of the cylinder as it thus ascends is a stop plate $g$ that constitutes the lower end or foot of a jointed vertically reciprocable rod G, Figs. 1 and 4. The lower portion of such rod is supported in a suitable bearing in the outer end of the bracket $C^2$ attached to the adjacent portion of casing C, while its upper portion is adapted to release a spring-pressed lever $c^{14}$ from engagement by a pivotally mounted hook or latch $c^{15}$. The effect of this release is to cause the retraction of friction rolls $c^4$ out of engagement with casing C, thus leaving the latter free to be drawn upwardly by weight $c$. From the construction of the upper section of rod G' and the pivotal character of its connection with the lower portion thereof, it will be apparent that the further upward movement of the rod, once it has released latch $c^{15}$, is not impeded by such latch, nor is its subsequent return movement, upon the lowering of casing C, interfered with. The latch and lever $c^{14}$, engaging therewith, are designed to be manually reset, or restored to their initial positions after rod G has thus been returned to its lower position. Lever $f^5$, before described as being designed to lock rod $f^4$, and thereby weight $F'$ against movement, has its outer end disposed in the path of this same stop-plate $g$ whereby upward movement of the latter is adapted to effect the release of the weight in question with resultant actuation of gripping arms $f$. The construction of such lever arm $f^9$, as in the case of latch device $c^{15}$ is such as not to interfere with the return movement of stop $g$.

Release of weight $F'$, and retraction of friction rolls $c^4$, are timed so as to occur in the order here named, so that casing C is not drawn upwardly until after the cylinder gripping mechanism has become effective. The immediate result of the two movements in question is to attach the severing mechanism as it were to the upwardly advancing cylinder so as to move in unison therewith. The next operative step consists in releasing hand lever E' and thereby to bring the glass-cutter, proper, into contact with the cylinder. Upon now pulling down upon the appropriate handle $d^2$, such cutter is rotated once around within the cylinder and the latter thereby neatly severed. Ordinarily the severed section will at once part from the main portion of the cylinder along the line of the cut, owing to the additional pull to which the former is subjected; if not a slight tap upon the cylinder at such line will effect the desired result. Immediately the severed section is thus detached the weight $c$ is obviously entirely free, save for the braking action of the dash-pot, to raise such section clear of the cylinder below. The sleeve B' is now swung about through a half turn so as to position in turn the other arm $B^2$ over opening $a$, and the corresponding severing mechanism is lowered into the advancing cylinder as before, from which in due season a second section is severed. In the meantime the first section is freed from the gripping device and lowered onto a suitable truck (not shown) positioned therebelow, and is thence removed to be split and flattened. The several parts of the mechanism having been reset and placed in order the device is ready to be swung around again so soon as the second section has been cut off.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A device for severing glass cylinders, comprising exteriorly supported cylinder gripping means adapted to engage the interior of the section of cylinder to be severed, a rotatable glass-cutting tool borne by said gripping means within such cylinder and adapted to contact with the latter at a point below said gripping means, and means adapted to rotate said tool.

2. A device for severing glass cylinders, comprising exteriorly supported cylinder gripping means adapted to engage the interior of the section of cylinder to be severed, a rotatable glass-cutting tool borne by said gripping means within such cylinder and adapted to contact with the latter at a point below said gripping means, said tool lying normally out of contact with such cylinder, means adapted to move said tool into such contact and means adapted to rotate said tool.

3. A device for severing glass cylinders, comprising a rotatable shaft adapted to be centrally supported within the cylinder to be severed, a tubular shaft reciprocably mounted upon said first shaft, an arm borne by said first shaft so as to rotate therewith and connected with said tubular shaft so as to be positively actuated outwardly and inwardly upon reciprocation of the latter, and glass-cutting means mounted upon the outer end of said arm.

4. A device for severing glass cylinders, comprising a rotatable shaft adapted to be centrally supported within the cylinder to be severed, a tubular shaft reciprocably mounted upon said first shaft, an arm borne by said first shaft so as to rotate therewith and connected with said tubular shaft so as to be positively actuated outwardly and inwardly upon reciprocation of the latter, an extension pivotally attached to the outer end of said arm, and a glass-cutting tool borne by said extension.

5. A device for severing glass cylinders, comprising exteriorly supported casing adapted to depend centrally within the cylinder to be severed, a shaft rotatably supported in said casing, two tubular shafts reciprocably mounted, one within the other, upon said rotatable shaft, an arm borne by the lower projecting end of the latter so as to rotate therewith and connected with the inner of said tubular shafts so as to be actuated outwardly upon reciprocation of the same, glass-cutting means mounted upon the outer end of said arm, arms pivoted at their inner ends to the outer of said tubular shafts and having sliding pivotal engagement with said casing, and means borne by the outer ends of said arms adapted upon outward actuation thereof to grip the inner walls of the cylinder.

6. A device for severing successive sections from a continuously moving glass cylinder, comprising cylinder gripping means, a glass cutter movably mounted upon said gripping means and adapted to move in unison with such cylinder, and means for operating said gripping means and cutter respectively.

7. A device for severing successive sections from a continuously moving glass cylinder, comprising cylinder gripping and glass cutting means adapted to move in unison with such cylinder, both said means being normally inoperative, automatic means for operating the former, and manual means for operating the latter.

8. A device for severing successive sections from a continuously moving glass cylinder, comprising cylinder gripping and glass cutting means adapted to move in unison with such cylinder, both said means being normally stationary with respect thereto, and means, controlled by the movement of such cylinder, adapted to render the same thus movable.

9. A device for severing successive sections from a continuously moving glass cylinder, comprising cylinder gripping means, a glass cutting tool, both said gripping means and cutting tool being movable in unison with the cylinder to be severed, means, controlled by the movement of the latter, adapted to render aforesaid means and tool thus movable, and means for operating said cutting tool.

10. In mechanism of the class described, the combination with a support rotatable about a vertical axis and provided with a plurality of projecting arms, of cylinder gripping means mounted so as to be vertically movable in said arms respectively, said means being adapted to depend within the cylinder to be gripped.

11. A device for severing successive sections from a continuously moving glass cylinder, comprising a plurality of cylinder gripping means adapted to be successively positioned in operative relation with respect to such cylinder, and glass cutting means in connection with each of said gripping means.

12. A device for severing successive sections from a continuously moving glass cylinder, comprising a support movable transversely of such cylinder, cylinder gripping means mounted so as to be vertically movable in said support and adapted to depend within the cylinder, and glass cutting means in connection with said gripping means.

13. A device for severing successive sections from a continuously moving glass cylinder, comprising a support movable transversely of such cylinder, a casing mounted so as to be vertically movable in said support and adapted to depend centrally within the cylinder, a shaft rotatably supported within said casing, two tubular shafts reciprocably mounted, one within the other, upon said rotatable shaft, an arm borne by the lower projecting end of the latter so as to rotate therewith and connected with the inner of said tubular shafts so as to be actuated outwardly upon reciprocation of the same, glass cutting means mounted upon the outer end of said arm, arms pivoted at their inner ends to the outer of said tubular shafts and having sliding pivotal engagement with said casing, and means borne by the outer ends of said arms adapted upon outwardly actuation thereof to grip the inner walls of the cylinder.

14. A device for severing successive sections from a continuously moving glass cylinder, comprising two arms pivoted so as to swing about a substantially vertical axis, a casing mounted in each of said arms so as to be vertically movable with respect to the same, said casings being respectively adapted when the corresponding arm is properly positioned to depend centrally within the cylinder, a shaft rotatably supported within each of said casings, two tubular shafts reciprocably mounted, one within the other, upon said rotatable shaft, an arm borne by the lower projecting end of the latter so as to rotate therewith and connected with the inner of said tubular shafts so as to be actuated outwardly upon reciprocation of the same, glass cutting means mounted upon the outer end of said arm, arms pivoted at their inner ends to the outer of said tubular shafts and having sliding pivotal engagement with said casing, and means borne by the outer ends of said arms adapted upon outwardly actuation thereof to grip the inner walls of the cylinder.

15. A device for severing successive sections from a continuously moving glass cylinder, comprising a support movable transversely of such cylinder, cylinder gripping means mounted so as to be vertically movable in said support and adapted to depend within said cylinder, a weight adapted to raise said gripping means together with a severed cylinder section, and means adapted to lower said gripping means and retain the same in lowered position.

16. A device for severing successive sections from a continuously moving glass cylinder, comprising a support movable transversely of such cylinder, cylinder gripping means mounted so as to be vertically movable in said support and adapted to depend within said cylinder, a weight adapted to raise said gripping means together with a severed cylinder section, motor-driven friction rolls adapted to engage said gripping means to lower the same and retain the same in lowered position, and means for controlling engagement of said rolls with said gripping means.

17. A device for severing successive sections from a continuously moving glass cylinder, comprising a support movable transversely of such cylinder, cylinder gripping means mounted so as to be vertically movable in said support and adapted to depend within said cylinder, a weight adapted to raise said gripping means together with a severed cylinder section, motor-driven friction rolls adapted to engage said gripping means to lower the same and retain the same in lowered position, and means for controlling engagement of said rolls with said gripping means, the actuation of said means being rendered effective by certain movement of the cylinder.

Signed by me this 3rd day of June, 1907.

ROBERT L. FRINK.

Attested by—
  E. R. RODD,
  JNO. F. OBERLIN.